United States Patent
Bolen et al.

(10) Patent No.: US 11,836,100 B1
(45) Date of Patent: Dec. 5, 2023

(54) REDUNDANT BASEBOARD MANAGEMENT CONTROLLER (BMC) SYSTEM AND METHOD

(71) Applicant: Dell Products, L.P., Round Rock, TX (US)

(72) Inventors: Austin P. Bolen, Austin, TX (US); Komal Dhote, Chhattisgarh (IN); Manjunath A M, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/807,157

(22) Filed: Jun. 16, 2022

(51) Int. Cl.
*G06F 13/16* (2006.01)
*G06F 12/02* (2006.01)

(52) U.S. Cl.
CPC ...... *G06F 13/1684* (2013.01); *G06F 12/0238* (2013.01); *G06F 2212/202* (2013.01)

(58) Field of Classification Search
CPC ............. G06F 13/1684; G06F 12/0238; G06F 2212/202
See application file for complete search history.

(56) References Cited

U.S. PATENT DOCUMENTS

| | | | | |
|---|---|---|---|---|
| 9,335,986 | B1* | 5/2016 | Bowen | G06F 8/656 |
| 2014/0122852 | A1* | 5/2014 | Guo | G06F 9/00 713/1 |
| 2015/0074448 | A1* | 3/2015 | Ageishi | G06F 11/0784 714/4.11 |
| 2017/0102889 | A1* | 4/2017 | Lobo | G06F 11/1415 |
| 2018/0039552 | A1* | 2/2018 | Moskowiz | G06F 11/2028 |
| 2018/0357108 | A1* | 12/2018 | Mullender | G06F 9/45558 |
| 2020/0250053 | A1* | 8/2020 | Bhatia | G06F 9/4408 |
| 2021/0286747 | A1* | 9/2021 | Olarig | G06F 3/067 |
| 2022/0398103 | A1* | 12/2022 | Maddukuri | G06F 9/4418 |
| 2022/0398152 | A1* | 12/2022 | Cho | G06F 11/0706 |

* cited by examiner

*Primary Examiner* — Faisal M Zaman
(74) *Attorney, Agent, or Firm* — Fogarty LLP

(57) ABSTRACT

According to one embodiment, an Information Handling System (IHS) includes at least one storage unit that conforms to an NVMe specification and first and second BMCs. The BMCs are in communication with the storage unit and each configured with computer-executable instructions to negotiate with the second BMC, whether first or second BMC is to be an active BMC such that the other of the first or second BMCs becomes a passive BMC. When the first BMC is the active BMC, allow shared commands to be issued to a storage unit conforming to a Non-Volatile Memory Express (NVMe) specification; otherwise, inhibit the shared commands from being issued to the storage unit.

18 Claims, 4 Drawing Sheets

US 11,836,100 B1

REDUNDANT BASEBOARD MANAGEMENT CONTROLLER (BMC) SYSTEM AND METHOD

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware, and software components that may be configured to process, store, and communicate information and may include one or more computer systems, data storage systems, and networking systems.

Many data storage systems provide an interface to connect one or more storage devices to an IHS. One particular type of interface, namely a Non-Volatile Memory Express (NVMe) specification, has been implemented for solid state drives (SSDs). The NVMe specification is promulgated by a non-profit consortium of tech industry leaders defining, managing, and marketing NVMe devices. For example, version 2.0 of the NVMe specification includes multiple documents, such as the NVMe Base specification, Command Set specifications, Transport level specifications, and the NVMe Management Interface (NVMe-MI) specification. NVMe devices are relatively more efficient than their legacy counterparts, such as the serial ATA (SATA) that predominantly rely on traditional storage involving hard disks. The NVMe specification essentially leverages the high performance (e.g., fast response time, low latency, etc.) of solid state drives to provide high performance storage arrays for large, scaled out IHSs, such as those that may be housed in data centers. The NVMe specification also contains host-to-device protocol for SSD commands used by an operating system for various operations, such as read, write, firmware management, temperature management, error handling, and others.

SUMMARY

According to one embodiment, an Information Handling System (IHS) includes at least one storage unit that conforms to an NVMe specification and first and second BMCs. The BMCs are in communication with the storage unit and each configured with computer-executable instructions to negotiate with the second BMC, whether first or second BMC is to be an active BMC such that the other of the first or second BMCs becomes a passive BMC. When the first BMC is the active BMC, allow shared commands to be issued to a storage unit conforming to a Non-Volatile Memory Express (NVMe) specification; otherwise, inhibit the shared commands from being issued to the storage unit.

According to another embodiment, a method includes the steps of negotiating, by a first BMC with a second BMC, whether the first or second BMC is to be an active BMC in which the other of the first or second BMC becoming a passive BMC. when the first BMC is the active BMC, allowing shared commands to be issued to a storage unit conforming to a Non-Volatile Memory Express (NVMe) specification, and when the first BMC is the passive BMC, inhibiting the shared commands from being issued to the storage unit. The shared commands including a type that changes a state of the storage unit when issued to the storage unit.

According to yet another embodiment, a computer program product includes a computer readable storage medium having program instructions stored thereon that, upon execution by each of first and second BMCs, cause the first BMC to negotiate with the second BMC, whether first or second BMC is to be an active BMC, the other of the first or second BMC becoming a passive BMC. When the first BMC is the active BMC, allow shared commands to be issued to a storage unit, and when the first BMC is the passive BMC, inhibit the shared commands from being issued to the storage unit. The storage unit conforms to a Non-Volatile Memory Express (NVMe) specification, while the shared commands include a type that changes a state of the storage unit when issued to the storage unit.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
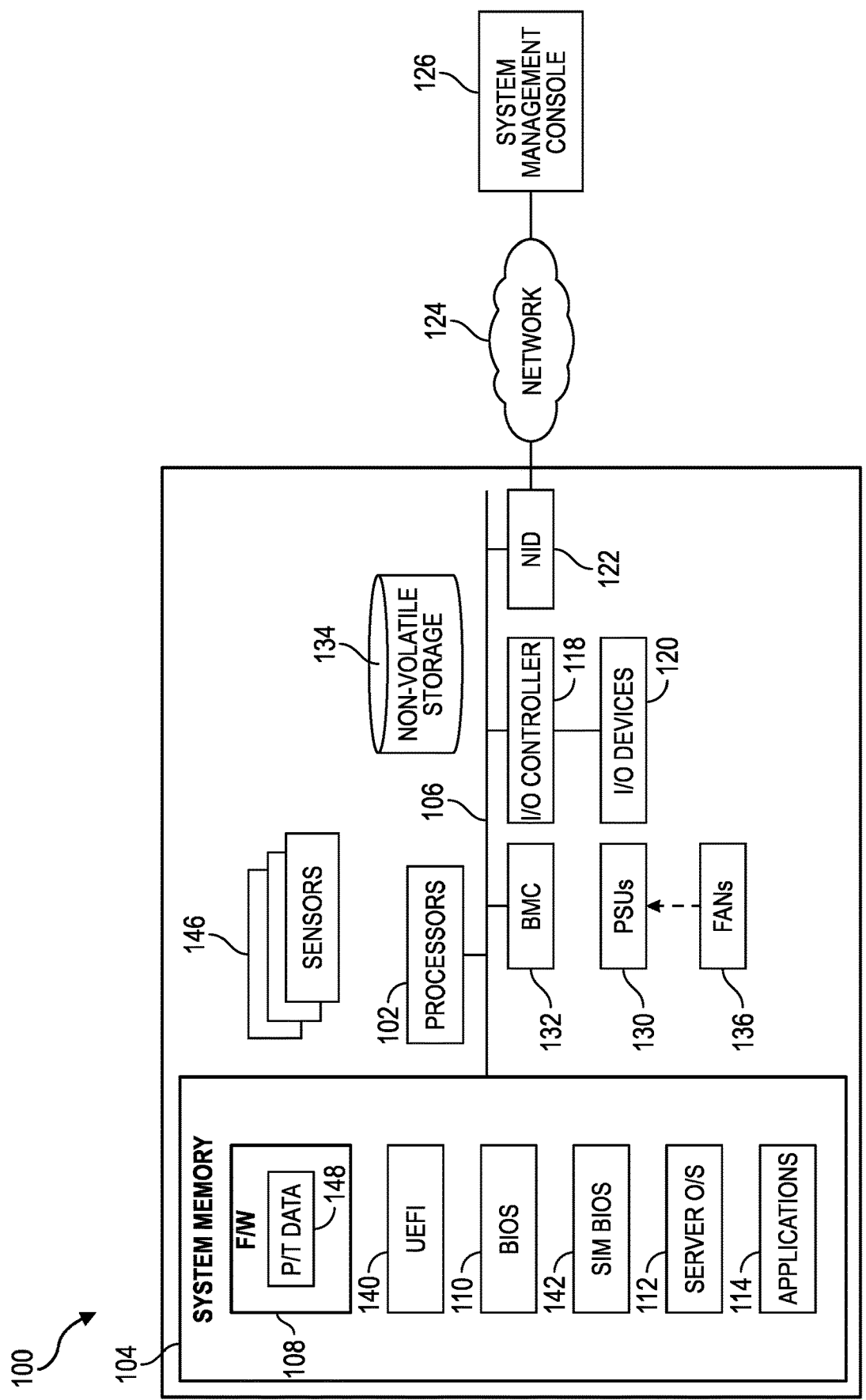
FIG. 1 is a block diagram of examples of components of an Information Handling System (IHS) that may be used to implement an NVMe-based multiple Baseboard Management Controller (BMC) system and method according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Embodiments of the present disclosure provide an NVMe-based multiple Baseboard Management Controller (BMC) system and method that provides the management of one or more NVMe storage units by multiple (e.g., redundant) BMCs. The NVMe-based multiple BMC system and method provides several techniques for arbitrating control of two or more BMCs to a single NVMe device. Additionally, the NVMe-based multiple BMC system and method may provide a mechanism to have redundant sync connections between redundant BMCs by using any connection that does not proxy through the NVMe storage unit, such as a standard Ethernet connection in addition to using the NVMe device as a communications proxy between the two BMCs, for example, by using a metadata storage region on the NVMe storage unit.

Management of NVMe storage units are often managed by a Baseboard Management Controller (BMC) that is deployed in an IHS. Recently, NVMe storage units have been developed with increased storage density and reduced cost, thus making them a viable alternative for the storage needs of relatively large, scaled-out IHSs, such as data centers. The management of NVMe storage units is often performed via an out-of-band System Management Bus (SMBus) interface to the BMC. The SMBus interface is often used in lieu of the traditional in-band Peripheral Component Interconnect Express (PCIe) interface because, among other things, the SMBus interface does not interfere with the actual storage data path, and thus does not unduly impact Storage input/output (I/O) performance. As is the case in many implementations, the BMC performs management of NVMe storage units using the Management Component Transport Protocol (MCTP). In general, MCTP is a Distributed Management Task Force (DMTF) standard which is platform-agnostic and defines the management protocol between a BMC and certain managed devices (e.g., NVMe storage units, PCIe devices etc.) in a storage system.

The NVMe Management Interface (NVMe-MI) is a standard that defines an architecture and command set for out-of-band management of an NVMe storage unit by a BMC over SMBus or PCIe Vendor Defined Messages (VDMs). The NVMe-MI architecture, however, is designed to support only a single BMC. This limitation can become burdensome, particularly when it may be desirable to implement multiple BMCs for those IHSs that require High Availability (HA). Accordingly, embodiments of the present disclosure provide a multiple BMC system and method that enables the use of multiple BMCs within a single IHS by arbitrating command usage on NVMe storage units by each of the IHS's constituent BMCs.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS) that may be used to implement an NVMe-based multiple BMC system and method according to one embodiment of the present disclosure. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

Firmware (F/W) 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or an SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

For the purposes of this disclosure, the term "system management console" may refer broadly to systems that are configured to couple to a management controller and issue management instructions for an information handling system (e.g., computing device) that is being managed by the management controller. One example of such a system management console is the Dell OpenManage Enterprise (OME) systems management console. In various embodiments, management consoles may be implemented via specialized hardware and/or via software running on a standard information handling system. In one embodiment, a system management console may be deployed on a secure virtual machine (VM), such as a VMWARE Workstation appliance.

IHS 100 further includes one or more power supply units (PSUs) 130. PSUs 130 are coupled to a BMC 132 via an I2C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively substantial amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. BMC 132 may perform management operations even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
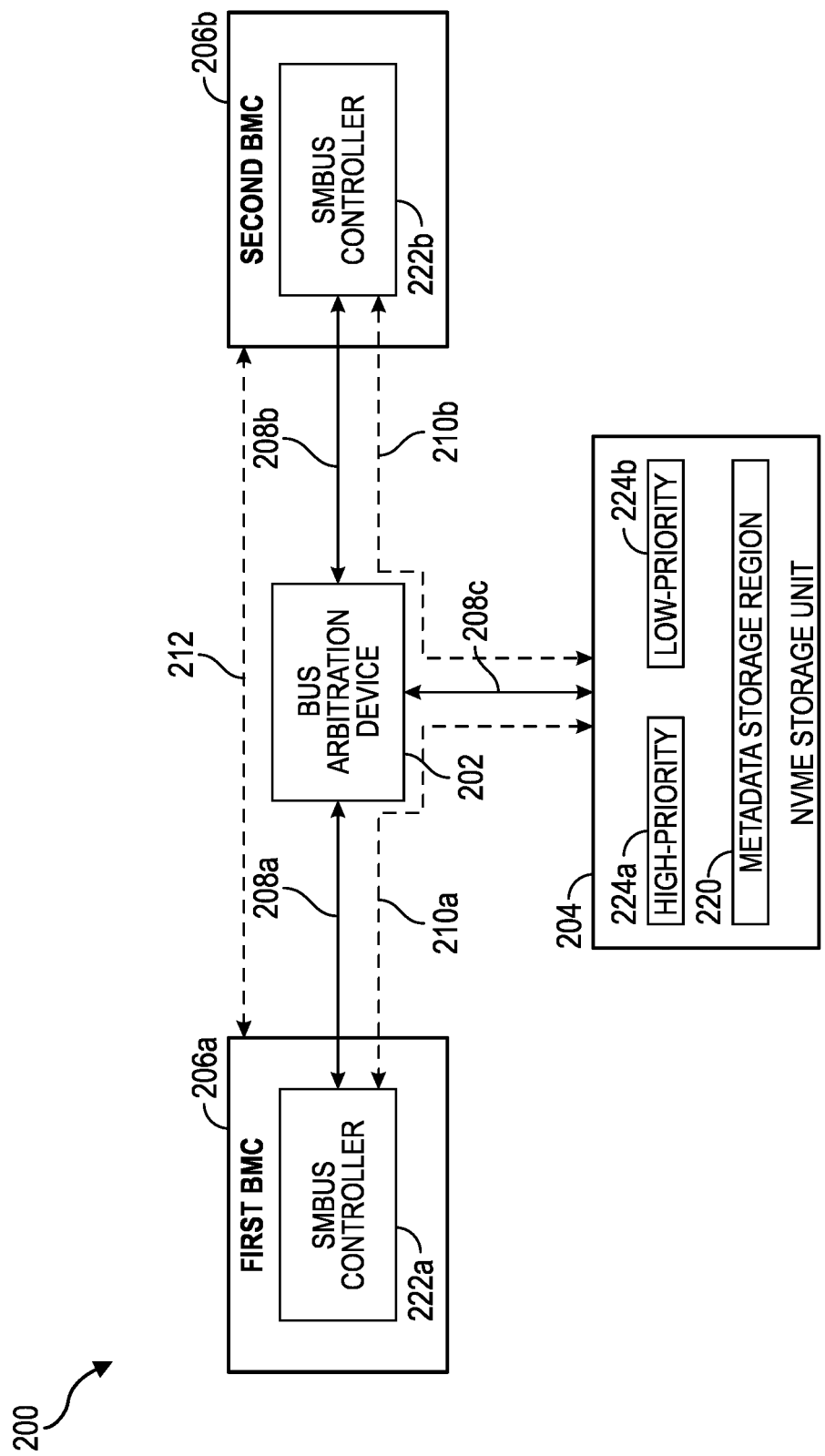
FIG. 2 illustrates an example multiple BMC system that may be provided for enabling management of an NVMe storage unit by multiple BMCs according to one embodiment of the present disclosure.

FIG. 2 illustrates an example multiple BMC system 200 that may be provided for enabling management of an NVMe storage unit 204 by multiple BMCs that negotiate to each use a separate command slot so that they do not conflict according to one embodiment of the present disclosure. The multiple BMC system 200 generally includes a bus arbitration device 202 in communication with an NVMe storage unit 204 and two BMCs 206a-b (collectively 206) via an SMBus controller 222a-b, which in this particular embodiment, provides an SMBus connection 208a-c. As will be described in detail herein below, the BMCs 206 arbitrate use of a high-priority command slot 224a and a low-priority command slot 224b so that management of the NVMe storage unit 204 by the BMCs 206 may be coordinated with one another. In one aspect, the bus arbitration device 202 functions as a mutex (e.g., lock, semaphore, etc.) for the SMBus so that only one BMC 206 can be in control of it at a time.

Each BMC 206 generally includes a specialized microcontroller embedded in the IHS, and may provide an interface between system-management software and platform hardware. Diverse types of sensors built into the IHS report to the BMC 206 on parameters such as temperature, cooling fan speeds, power status, operating system (O/S) status, and the like. The BMC 206 monitors the sensors and can send alerts to a system administrator via the network if any of the parameters do not stay within pre-set limits, indicating a potential failure of certain hardware devices in the IHS. The administrator can also remotely communicate with the BMC 206 to take certain corrective actions, such as resetting or power cycling the system to get a hung O/S running again. These abilities can often save on the total cost of ownership of an IHS, particularly when implemented in large clusters, such as server farms.

When both BMCs 206 are functioning normally, the BMCs 206 communicate with one another using a primary sync connection 212, such as an Ethernet connection. Nevertheless, when the primary sync connection 212 fails, the BMCs 206 will failover to an alternate sync connection comprising connection 210a, metadata storage region 220 configured in the NVMe storage unit 204, and connection 210b. The primary sync connection 212 and alternate sync connections 210a-b generally refer to logical connections established through either an Ethernet connection or through the SMBus 208a-c, respectively, for the purpose of continually synchronizing the status and/or activities of each BMC 206 with one another. Additional features of the metadata storage primary sync connection 212 and alternate sync connections 210a-b will be described in detail herein below.

The first and second BMCs 206 may operate in either of an active-active configuration or an active-passive configuration. The active-active configuration generally refers to a mode of operation in which commands from both the first and second BMCs 206 are interleaved to the NVMe storage unit 204. The active-passive configuration, on the other hand, refers to a mode of operation in which a passive BMC 206 is inhibited from issuing commands that change any state shared between multiple BMCs (i.e., shared commands) to the NVMe storage unit 204. Shared commands generally refer to those commands that may cause the NVMe storage unit 204 to change state and is shared with another BMC, while non-shared commands (e.g., data requesting commands) do not change a state that is shared with the other BMC. A passive BMC, nevertheless, can change state for things that are unique or dedicated to the passive BMC. The standard NVMe-MI protocol does not have provisions to handle multiple BMCs, but can be extended to handle that by creating a new host metadata type that uses the metadata storage region 220. The new host metadata type will add fields to allow the active BMC to send whatever synchronization data is needed to the passive BMC (e.g., health, temperature, status, heartbeat, which operations have been performed on the device, etc.).

Cases exist where it would be beneficial for each BMC 206 to interleave commands to the NVMe storage unit 204. Examples include when it is desired to operate an active-active configuration, or when it is desired to operate in an active-passive configuration using the alternate sync connections 210a-b. In such cases, the metadata storage region 220 on the NVMe storage unit 204 may be used as a communication proxy between the two BMCs 206 to share information. That is, the metadata storage region 220 may be provided to store information used to synchronize the status and activities of each BMC 206 with one another.

The metadata storage region 220 may provide certain advantages, such as providing a communication proxy between the two BMCs 206a-b for the alternate sync connections 210a-b. This allows high availability (HA) without the added expense of adding a second primary sync connection. By default, the BMCs 206a-b may use the primary sync connection 212. Thus, if communication is lost on the primary sync connection 212, then either of the BMCs 206a-b can convert over to the alternate sync connection 210a-b using the metadata storage region 220.

The BMCs 206 may negotiate with one another whether they are to run in active-active mode or active-passive mode by communicating with each over the primary sync connection, if available, or the secondary sync connection if the primary is not available. The BMCs 206 may also negotiate with one another which BMC 206 is active and which BMC 206 is passive when they are run in active-passive mode. An active-active mode generally refers to a device management technique in which both BMCs 206 actively perform operations, such as issuing commands, on the NVMe storage unit 204. When in the active-active mode, for example, one BMC 206a may delay the issuance of a particular command until a previously issued command from the BMC 206b has been completed. The active-passive mode, on the other hand, refers to a management technique in which one BMC (e.g., BMC 206a or BMC 206b) is allowed to actively issue commands to the NVMe storage unit 204, while the other BMC (e.g., BMC 206b or BMC 206a) is inhibited from issuing shared commands to the NVMe storage unit 204. To keep the passive BMC 206 synchronized with the active BMC 206, the active BMC 206 sends sync info directly to the passive BMC via the primary sync connection; thus, the passive BMC 206 does not need to issue any commands to the NVMe storage unit 204 in this case. When, however, the active BMC 206 sends sync info to the passive BMC 206 via the alternate sync connection using host metadata storage region 220, the passive BMC 206 does need to issue commands to the NVMe storage unit 204, but is only allowed to issue commands to access the host metadata to get the synchronization info stored there by the active BMC 206.

Such an active-passive mode may be useful for scenarios in which, when the active BMC fails, the passive BMC may readily take over operation of the NVMe storage unit 204 because it always maintains a current status of the NVMe storage unit 204 due to its monitoring behavior. In some embodiments, the passive BMC may issue commands to the NVMe storage unit 204, but these commands may be limited to obtaining the ongoing status of the NVMe storage unit 204, such as retrieving a temperature measurement from the NVMe storage unit 204, obtaining a level of storage capacity available within the NVMe storage unit 204, and the like. In the active-passive mode, the primary sync connection 212 or alternate sync connection 210a-b allow the BMCs 206a-b to co-ordinate with one another. Existing techniques can be used for this arbitration and are not explicitly described herein for purposes of brevity and clarity of disclosure.

While in the active-passive mode, the active BMC 206 will communicate certain information to the passive BMC 206, such as information related to health, operating temperature, status, and/or a list of operations that have been performed on the NVMe storage unit 204, by the primary sync connection 212 or the alternate sync connection if the primary sync connection is not available. Likewise, if the passive BMC 206 desires to have any operations performed on the NVMe storage unit 204, it can request the active BMC 206 to do so on its behalf via the primary sync connection 212 or the alternate sync connection if the primary sync connection is not available.

In one embodiment, each BMC 206 may send a heartbeat message (e.g., pulse, packet, etc.) to the other BMC 206 using the primary sync connection 212 to confirm that it is alive (e.g., functioning normally). The heartbeat message may be transmitted to each other at ongoing intervals (e.g., periodically), such as every 30 seconds, 2 minutes, 5 minutes, and the like. If, however, no heartbeat message is received over an elapsed period of time (e.g., longer than the heartbeat interval), then the BMCs 206 may switch to the alternate sync connection 210a-b to access and update status information from each other. If the active BMC 206 cannot get a heartbeat message from the passive BMC 206 on either primary sync connection 212 or alternate sync connection 210a, 210b, but it can communicate with the NVMe storage unit 204, it will remain the active BMC and report the error about the passive BMC. If the active BMC 206 cannot get a heartbeat message from the passive BMC 206 on either the primary or alternate sync connection and it cannot communicate with the NVMe storage unit 204, it will report the error indicating that the primary sync connection 212 has failed and that it can no longer communicate with the NVMe storage unit 204. If the BMCs cannot get each other's heartbeat messages on the primary sync connection 212 but switch to the alternate sync connection 210a, 210b and can get the heartbeats, then the active BMC will remain the active BMC and report an error with the primary sync connection 212. If the passive BMC 206 cannot get a heartbeat from the active BMC 206 on either primary or alternate sync connection and it can communicate with the NVMe storage unit 204, it will make itself the active BMC and will report the error that the primary sync connection 212 has failed and it has taken over as active BMC since it cannot talk to the other BMC.

The NVMe-MI protocol does not permit multiple BMCs to access a single NVMe device, yet it does support two command slots. The term "command slot," as used herein, generally refers to a logical target within an NVMe device that is configured to receive messages from a management endpoint (e.g., BMCs 206a-b). Each command slot may have an associated Command Slot Identifier (CSI) that indicates the command slot with which a message is associated.

The reason that the NVMe-MI protocol supports two command slots is to give the BMC 206 a high-priority queue (e.g., command slot 0) and a low-priority queue (e.g., command slot 1). As such, the BMCs 206a-b could negotiate to each use a separate command slot so that they do not conflict during initial arbitration. In some cases, each command slot is usable exclusively by an assigned one of BMCs 206a-b. Any suitable type of arbitration mechanism could be used. For example, the BMCs 206 would negotiate with each other which one gets the high-priority command slot 224a and the other one that gets low-priority command slot 224b by communicating with each other over the primary sync connection, if available, or the secondary sync connection if the primary is not available.

Figure 3:
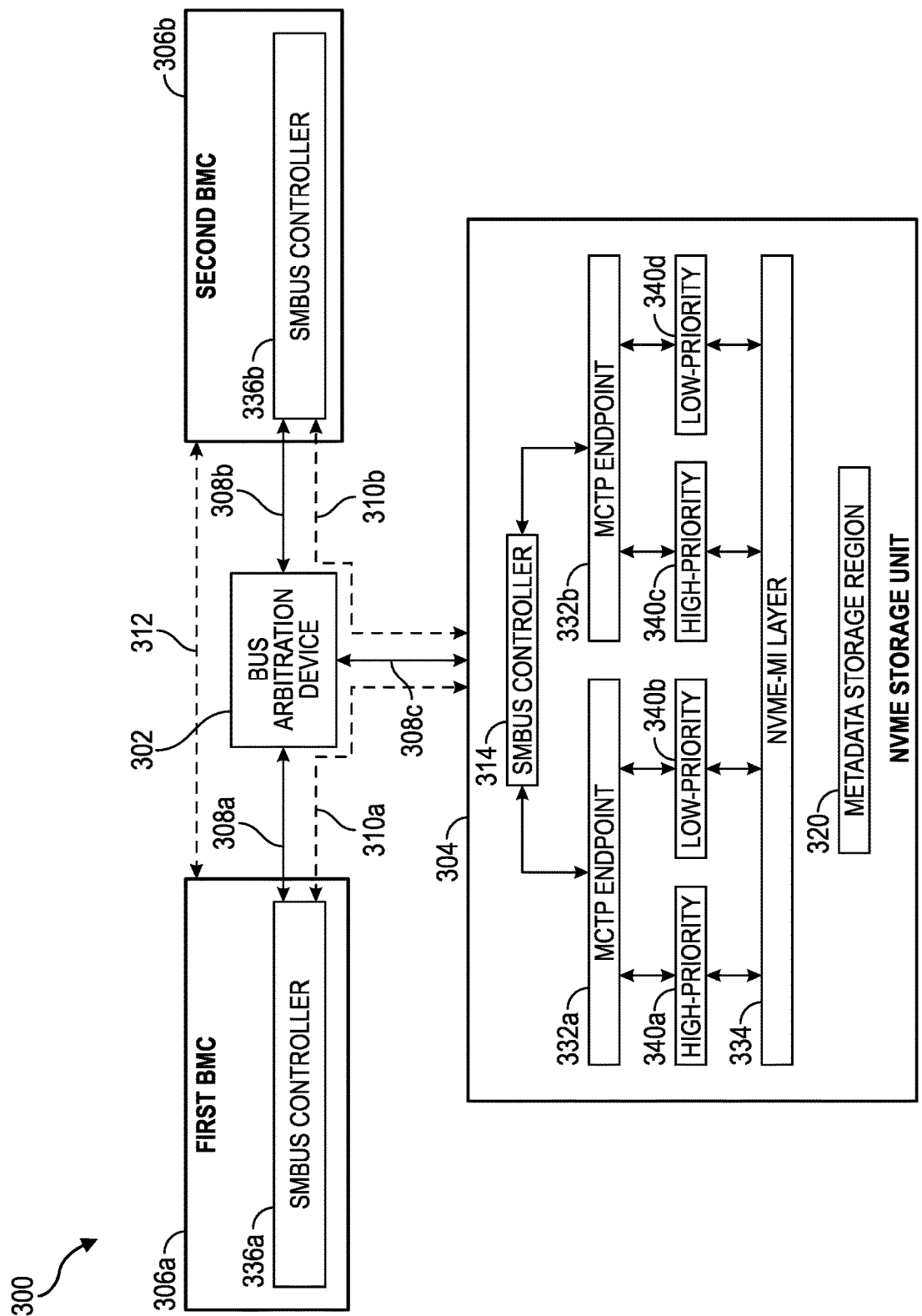
FIG. 3 illustrates another example multiple BMC system that may be provided for enabling management of an NVMe storage unit by multiple BMCs according to one embodiment of the present disclosure.

FIG. 3 illustrates another example multiple BMC system 300 that may be provided for enabling management of an NVMe storage unit 304 by multiple BMCs according to one embodiment of the present disclosure. The multiple BMC system 300 includes a bus arbitration device 302, an NVMe storage unit 304 configured with a metadata storage region 320, and an SMBus 308a-c providing a primary sync connection 312 and alternate sync connections comprising SMBus controller 336a, SMBus 308a, SMBus 308c, SMBus 308b, and SMBus controller 336b that are at least partially similar in design and construction to the bus arbitration device 202, NVMe storage unit 204, metadata storage region 220, and SMBus 208a-c providing a primary sync connection 212 and alternate sync connections 210a-b of FIG. 2.

The multiple BMC system 300 also includes two BMCs 306a-b (collectively 306). The NVMe storage unit 304 includes two MCTP endpoints 332a-b (collectively 332), an NVMe-MI layer 334, and an SMBus controller 314. The MCTP endpoints 332 serve as a destination or a source of MCTP packets or messages arranged according to the MCTP specification and communicated using the MCTP transport protocol. For example, the BMCs 306a-b may, using the MCTP endpoints 332, communicate with the NVMe storage unit 304 using MCTP.

According to one embodiment of the present disclosure, one or more MCTP endpoints may be used to provide additional command slots. In the particular embodiment shown, two MCTP endpoints 332a-b are used in which MCTP endpoint 332a provides two command queues that may be designated as a high-priority command slot 340a and a low-priority command slot 340b for BMC 306a, while MCTP endpoint 332b provides two command queues that may be designated as a high-priority command slot 340c and a low-priority command slot 340d for BMC 306b. Other configurations may be used, such as a single MCTP endpoint 332 that provides four command queues that can be designated as the high-priority and low-priority command slots for each BMC 306a-b. More queues could be added to support more than two BMCs, such as providing six command queues that could designated as three pairs of high-priority/low-priority command slots to be used by a corresponding three BMCs 306.

The NVMe-MI protocol only natively supports a single MCTP endpoint on the SMBus 308a-c where each MCTP endpoint 332a-b supports two command slots. Thus, the number of supported MCTP endpoints could be expanded to support two or more MCTP endpoints. Additionally, each MCTP endpoint 332a-b could be controlled by a different BMC 306a-b.

Using one of these mechanisms described above, two or more BMCs 306a-b can communicate with a single NVMe storage unit 304 by providing a high-priority and low-priority command slots for each BMC 306a-b. Nevertheless, the status bits used in the NVMe-MI protocol also assume a single BMC. Thus, if one BMC clears the status bits, then the other BMC may not have access to this information. Accordingly, several embodiments of this disclosure exist that could address this.

In one embodiment, the status bits could be duplicated for each MCTP endpoint 332a-b. In another embodiment, the status bits may be synchronized by having one BMC 306 in charge of clearing status. The BMC clearing the status bits would need to wait to clear the status bits until the other BMC has signaled that it acknowledges the cleared status bit via one of the sync mechanisms. In yet another embodiment of the multiple BMC system 300, one BMC may be in charge of clearing status bits in which it may read the state of the status bits and send them to the other BMC via one of the sync mechanisms.

Additional conflicts may exist at higher logical levels. For example, running a Trusted Computing Group (TCG) Opal protocol to unlock NVMe storage units (e.g., drives) could encounter command sequence errors if done by two different BMCs. Other operations could be performed by one designated BMC to avoid duplication of work such as a sanitize operation that may be performed on an NVMe device. Similar to one of the solutions for the status bits as described above, one BMC can be in charge of these operations, and that BMC can send the status of the operations to the other BMC via one of the sync mechanisms as described above.

Figure 4:
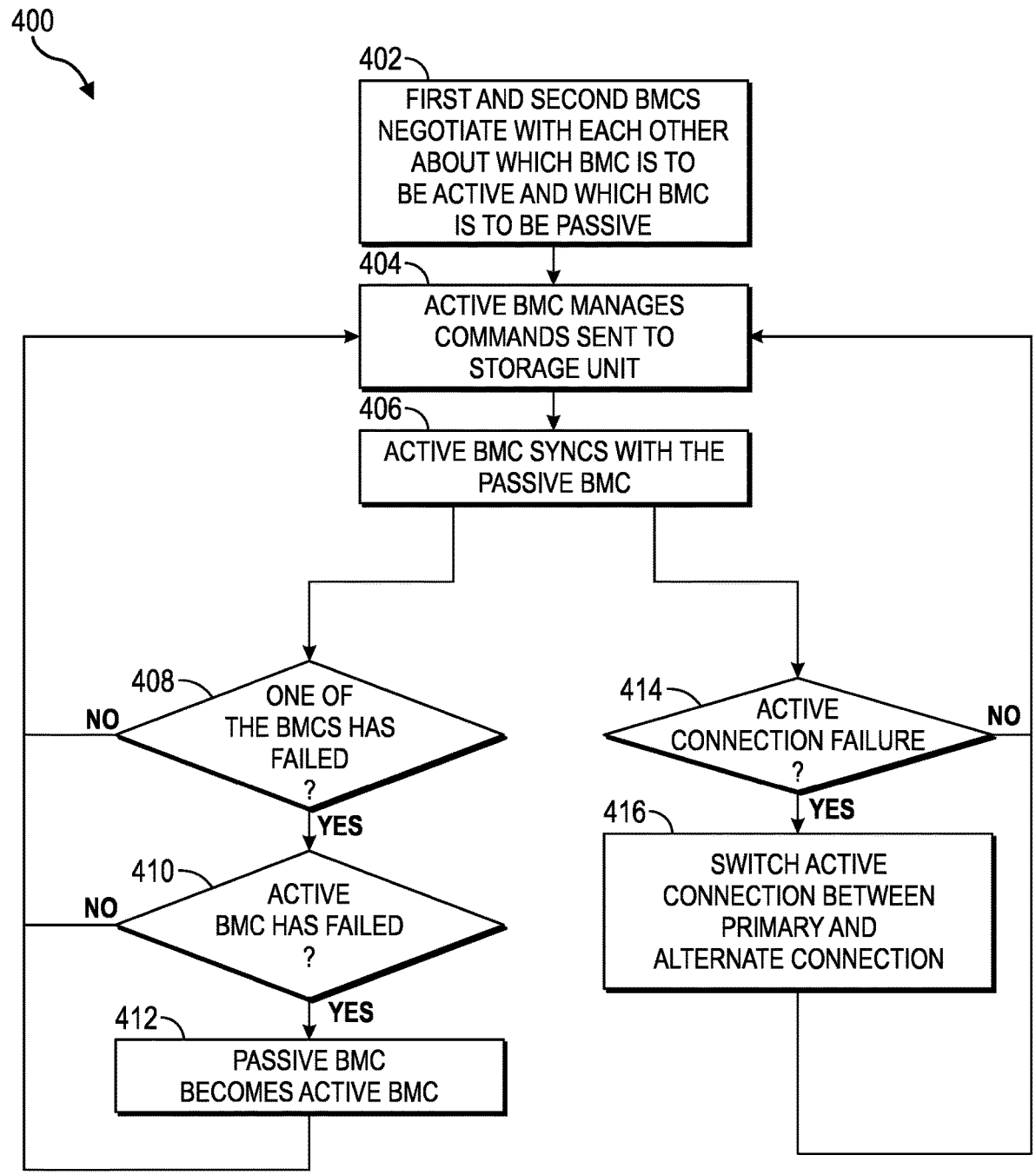
FIG. 4 illustrates an example multiple BMC management method that may be provided for enabling management of an NVMe storage unit by multiple, redundant BMCs according to one embodiment of the present disclosure.

FIG. 4 illustrates an example multiple BMC management method 400 that may be provided for enabling management of an NVMe storage unit by multiple, redundant BMCs according to one embodiment of the present disclosure.

Additionally or alternatively, the method 400 may be performed in whole or in part by first and second BMCs configured in an IHS 100. The bus arbitration device may be embodied on any suitable device configured in the IHS 100. For example, the bus arbitration device may be included as at least a part of an expansion card of the IHS 100, or a BIOS portion of the IHS 100. Initially, the IHS 100 is configured with an NVMe storage unit, and at least two BMCs.

At step 402, the first and second BMCs negotiate with each other about which BMC is to operate in an active mode and which is to operate in a passive mode. During initial arbitration, the BMCs could also negotiate to each use a separate command slot so that they do not conflict. Any suitable negotiation technique may be used. For example, the BMCs may designate the BMC with the lower ID to get command slot 0 and operate in the active mode, while the BMC with the higher ID to get command slot 1 and operate in the passive mode.

In one embodiment, the first and second BMCs delegate which BMC is to use a first command slot and which BMC is to use a second command slot of the storage unit that may be, for example, one that functions according to the NVMe-MI specification. The BMCs may be configured to operate in either of an active-active mode or an active-passive mode. In another embodiment, multiple command slots may be provided by one or more MCTP endpoints configured in the NVMe storage unit so that each BMC may be configured with its own high-priority and low-priority command slots (e.g., four total command slots).

At step 404, the active BMC manages commands sent to the NVMe storage unit. These commands may be shared commands as well as non-shared commands. The passive BMC, however, is only allowed to issue non-shared commands to the NVMe storage unit, which may include, for example, commands used for accessing the metadata storage region.

At step 406, the active BMC synchronizes the state of the NVMe storage unit with the passive BMC using either the primary sync connection or the alternate sync connection if the primary sync connection is not available. For example, the active BMC may optionally establish a metadata storage region on the storage unit for storage of status information associated with the NVMe storage unit from the active BMC. In one embodiment, the information may be stored in the metadata storage region in a TLV format. In general, the method 400 uses the metadata storage region of the storage unit to enable the BMCs to communicate using the alternate sync connection. That is, step 404 may not be necessary if redundancy of the primary sync connection is not needed or desired. For example, each of steps described herein could be performed using either of the primary sync connection or the alternate sync connection.

In a multiple BMC system, it is important to ensure that the commands of either BMC do conflict with the commands of the other BMC. The NVMe-MI protocol only has a single set of status bits intended to be read and cleared by a single BMC. As such, if there are multiple BMCs, and one BMC clears the status bits, the other BMCs will not possess knowledge about how those status bits are set or cleared. In one embodiment, the passive BMC could be synchronized with the active BMC by duplicating, by the NVMe storage unit, the status bits in each MCTP endpoint if the NVMe storage unit is configured with multiple MCTP endpoints. In another embodiment, the active BMC could be responsible for managing how the status bits are cleared. For example, the active BMC would be configured to wait to clear the status bits until the passive BMC has acknowledged, via the primary or alternate sync connection, that it has read the status bits. In another example, the active BMC may unilaterally clear the status bits followed by sending information associated with the cleared status bits to the passive BMC.

At step 408, the method 400 determines whether one of the BMCs has failed. If not, processing continues at step 404 to manage other commands issued to the NVMe storage unit; otherwise, processing continues at step 410 to determine whether the active BMC or passive BMC has failed. For example, the active BMC may determine that, according to non-receipt of a heartbeat message over a specified period of time, the passive BMC has failed and in response, generate an alert message indicating that the passive BMC has failed. If the passive BMC determines that the active BMC has failed due to, for example, non-receipt of the heartbeat message, it may designate itself as the active BMC at step 412 and generate the alert message to notify responsible personnel. Thereafter, processing continues at step 404 to again manage commands issued to the NVMe storage unit.

At step 414, the active BMC determines whether the active connection (e.g., primary or alternate sync connection) has failed. If not, processing continues at step 404; otherwise, processing continues at step 416 in which the active and passive BMCs commence communicating over the other connection.

The method 400 as described above can be repeatedly performed to provide for failover operation of multiple, redundant BMCs configured in an IHS 100 as well as providing failover protection for multiple communication paths between the redundant BMCs, thus yielding a HA system whose failure is not dependent upon a failure of either one of the BMCs or any one communication path between them. Nevertheless, when use of the BMC bus arbitration method 400 is no longer needed or desired, the process ends.

Although FIG. 4 describes an example method that may be performed to manage multiple BMCs used with an NVMe storage unit, the features of the method 400 may be embodied in other specific forms without deviating from the spirit and scope of the present disclosure. For example, the method 400 may perform additional, fewer, or different operations than those described in the present examples. For another example, the method 400 may be performed in a sequence of steps different from that described above. As yet another example, certain steps of the method 400 may be performed by other components in the IHS 100 other than those described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An Information Handling System (IHS) comprising:
   first and second Baseboard Management Controllers (BMCs) coupled to a storage unit conforming to a Non-Volatile Memory Express (NVMe) specification, the first and second BMCs each comprising a processor and a memory coupled to the at least one processor, the memory having program instructions stored thereon that, upon execution by the processor, cause the first BMC to:
      negotiate with the second BMC, whether first or second BMC is to be an active BMC, the other of the first or second BMC becoming a passive BMC;
      when the first BMC is the active BMC, allow shared commands to be issued to the storage unit, the shared commands comprising a type that changes a state of the storage unit when issued to the storage unit;
      when the first BMC is the passive BMC, inhibit the shared commands from being issued to the storage unit;
      assign a first command slot of the storage unit for use by the first BMC to the exclusion of the second BMC; and
      assign a second command slot of the storage unit for use by the second BMC to the exclusion of the first BMC,
      wherein the first and second command slots conform to a Non-Volatile Memory Express Management Interface (NVMe-MI) specification.

2. The IHS of claim 1, wherein the program instructions, upon execution, further cause the first BMC to communicate with the second BMC using a primary synch connection.

3. The IHS of claim 2, wherein the program instructions, upon execution by the processor, further cause the first BMC to:
   when the primary synch connection fails, communicate with the second BMC using an alternate connection, the alternate connection comprising a first System Management Bus (SMBus) link from the first BMC to a metadata storage region of the storage unit, and a second SMBus link from the second BMC to the metadata storage region, wherein the alternate synch connection is configured to convey synchronization data between the first and second BMCs.

4. The IHS of claim 1, wherein the program instructions, upon execution, further cause the first BMC to:
  determine that a heartbeat message has not been timely received by the second BMC, the heartbeat message periodically sent through at least one of a primary synch connection or an alternate sync connection;
  when the first BMC is operating as the active BMC, generate a user alert message indicating that the second BMC has failed; and
  when the first BMC is operating as the passive BMC, generate the user alert message indicating that the second BMC has failed and commence operating as the active BMC.

5. The IHS of claim 1, wherein the program instructions, upon execution, further cause the first BMC to:
  assign a third command slot of the storage unit for use by the first BMC to the exclusion of the second BMC;
  assign a fourth command slot of the storage unit or use by the second BMC to the exclusion of the first BMC,
  wherein the first, second, third, and fourth command slots are provided by first and second Management Component Transport Protocol (MCTP) endpoints.

6. The IHS of claim 5, wherein the program instructions, upon execution, further cause the IHS to:
  when one or more events occur, duplicate, by the storage unit, the status bits associated with the occurrences in the first and second MCTP endpoints;
  read, by the first BMC, the status bits from the first MCTP endpoint;
  clear, by the first BMC, the status bits in the first MCTP endpoint;
  read, by the second BMC, the status bits from the second MCTP endpoint; and
  clear, by the second BMC, the status bits in the second MCTP endpoint.

7. The IHS of claim 5, wherein the program instructions, upon execution, further cause the IHS to:
  when at least one of the status bits associated with the storage unit is set, read the status bits by the first and second BMCs;
  send, by the second BMC, a notification that the second BMC has read the status bits to the first BMC using a synch connection; and
  clear the status bits by the first BMC.

8. The IHS of claim 5, wherein the program instructions, upon execution, further cause the IHS to:
  when at least one of the status bits associated with the storage unit is set, read the status bits by the first BMC;
  clear the status bits by the first BMC; and
  notify, by the first BMC, the second BMC about the cleared status bit using a synch connection.

9. A method comprising:
  negotiating, by a first Baseboard Management Controller (BMC) with a second BMC, whether the first or second BMC is to be an active BMC, the other of the first or second BMC becoming a passive BMC;
  when the first BMC is the active BMC, allowing shared commands to be issued to a storage unit conforming to a Non-Volatile Memory Express (NVMe) specification, the shared commands comprising a type that changes a state of the storage unit when issued to the storage unit;
  when the first BMC is the passive BMC, inhibiting the shared commands from being issued to the storage unit;
  assigning a first command slot of the storage unit for use by the first BMC to the exclusion of the second BMC; and
  assigning a second command slot of the storage unit for use by the second BMC to the exclusion of the first BMC,
  wherein the first and second command slots conform to a Non-Volatile Memory Express Management Interface (NVMe-MI) specification.

10. The method of claim 9, further comprising communicating between the first and second BMCs using a primary synch connection.

11. The method of claim 10, further comprising:
  when the primary synch connection fails, communicating synchronization data with the second BMC using an alternate connection, the alternate connection comprising a first System Management Bus (SMBus) link from the first BMC to a metadata storage region of the storage unit, and a second SMBus link from the second BMC to the metadata storage region.

12. The method of claim 9, further comprising:
  determining that a heartbeat message has not been timely received by the second BMC, the heartbeat message sent through at least one of a primary synch connection or an alternate sync connection;
  when the first BMC is operating as the active BMC, generating a user alert message indicating that the second BMC has failed; and
  when the first BMC is operating as the passive BMC, generating the user alert message indicating that the second BMC has failed and commence operating as the active BMC.

13. The method of claim 9, further comprising:
  assigning a third command slot of the storage unit for use by the first BMC to the exclusion of the second BMC;
  assigning a fourth command slot of the storage unit for use by the second BMC to the exclusion of the first BMC,
  wherein the first, second, third, and fourth command slots are provided by first and second Management Component Transport Protocol (MCTP) endpoints.

14. The method of claim 13, further comprising:
  when one or more events occur, duplicating, by the storage unit, the status bits associated with the occurrences in the first and second MCTP endpoints;
  reading, by the first BMC, the status bits from the first MCTP endpoint;
  clearing, by the first BMC, the status bits in the first MCTP endpoint;
  reading, by the second BMC, the status bits from the second MCTP endpoint; and
  clearing, by the second BMC, the status bits in the second MCTP endpoint.

15. The method of claim 13, further comprising:
  when at least one of the status bits associated with the storage unit is set, reading the status bits by the first and second BMCs; and
  when a notification that the second BMC has read the status bits is received by the first BMC using a synch connection, clearing the status bits by the first BMC.

16. The method of claim 13, further comprising:
  when at least one of the status bits associated with the storage unit is set, reading the status bits by the first BMC;
  clearing the status bits by the first BMC; and
  notifying, by the first BMC, the second BMC about the cleared status bits using a synch connection.

17. A computer program product comprising a computer readable storage medium having program instructions stored thereon that, upon execution by each of first and second Baseboard Management Controllers (BMCs), cause the first BMC to:
  negotiate with the second BMC, whether first or second BMC is to be an active BMC, the other of the first or second BMC becoming a passive BMC;
  when the first BMC is the active BMC, allow shared commands to be issued to a storage unit conforming to a Non-Volatile Memory Express (NVMe) specification, the shared commands comprising a type that changes a state of the storage unit when issued to the storage unit; and
  when the first BMC is the passive BMC, inhibit the shared commands from being issued to the storage unit;
  assign a first command slot of the storage unit for use by the first BMC to the exclusion of the second BMC; and
  assign a second command slot of the storage unit for use by the second BMC to the exclusion of the first BMC,
  wherein the first and second command slots conform to a Non-Volatile Memory Express Management Interface (NVMe-MI) specification.

18. The computer program product of claim 17, wherein the program instructions, upon execution, further cause the BMC to:
  when a primary synch connection fails, communicate with the second BMC using an alternate connection, the alternate connection comprising first System Management Bus (SMBus) link from the first BMC to a metadata storage region of the storage unit, and a second SMBus link from the second BMC to the metadata storage region, wherein the alternate synch connection is configured to convey synchronization data between the first and second BMCs.

* * * * *